United States Patent [19]
Plumat et al.

[11] 3,852,136
[45] Dec. 3, 1974

[54] PRODUCTION OF LAMINATED GLAZING

[75] Inventors: Emile Plumat, Gilly; Robert Van Laethem, Loverval; Pierre Colignon, Charleroi; Michel Wasterlain, Trazegnies; Pierre Votquenne, La Louviere, all of Belgium

[73] Assignee: Glaverbel S.A., Watermael-Boitsfort, Belgium

[22] Filed: Aug. 25, 1972

[21] Appl. No.: 283,792

Related U.S. Application Data

[63] Continuation-in-part of Ser. No. 148,401, June 1, 1971, abandoned.

[30] Foreign Application Priority Data
Dec. 8, 1971 Great Britain..................... 57079/71
July 11, 1972 Belgium.................................. 4190

[52] U.S. Cl................. 156/103, 156/104, 156/105, 156/106, 156/286, 156/312, 156/382
[51] Int. Cl....................... B32b 17/10, B32b 31/20
[58] Field of Search .......... 156/103, 104, 105, 106, 156/285, 286, 312, 382

[56] References Cited
UNITED STATES PATENTS

| | | | |
|---|---|---|---|
| 2,992,953 | 7/1961 | Talburtt.............................. | 156/104 |
| 3,074,466 | 1/1963 | Little ................................... | 156/382 |
| 3,272,611 | 9/1966 | Jorgenson........................... | 156/104 |
| 3,281,296 | 10/1966 | Jameson ............................. | 156/104 |
| 3,284,263 | 11/1966 | Jamet.................................. | 156/286 |
| 3,405,019 | 10/1968 | Seil et al............................. | 156/382 |
| 3,508,996 | 4/1970 | Hill...................................... | 156/382 |
| 3,769,133 | 10/1973 | Halberschmidt et al............ | 156/104 |

FOREIGN PATENTS OR APPLICATIONS
1,002,210  8/1970  Netherlands........................ 156/103
1,011,744  12/1965  Great Britain...................... 156/286

*Primary Examiner*—Daniel J. Fritsch
*Attorney, Agent, or Firm*—Spencer & Kaye

[57] ABSTRACT

A process and apparatus for forming a laminate by heating an assembly of at least two sheets of glass or vitrocrystalline material with a thermoplastic layer in the intersheet spaces between adjacent sheets. A preliminary treatment of the assembly takes place within an enclosure in which the assembly is heated to soften the thermoplastic layers and in which the heated assembly is exposed to a sub-atmospheric environmental pressure while the intersheet spaces at the peripheral margins of the assembly are subjected to a suction pressure substantially less than that of the sub-atmospheric environmental pressure. At the completion of the preliminary treatment the assembly is conveyed to another enclosure in which the assembly is exposed to higher temperatures than those used in the preliminary treatment so as to firmly bond the sheets by means of the thermoplastic layers.

24 Claims, 5 Drawing Figures

PRODUCTION OF LAMINATED GLAZING

CROSS REFERENCE TO RELATED APPLICATION

This application is a continuation-in-part of our application Ser. No. 148,401, filed June 1, 1971, now abandoned, entitled "Process and Apparatus for Producing Laminated Glazing."

BACKGROUND OF THE INVENTION

It is known in the art to laminate glass sheets by means of an intervening thermoplastic sheet to form a "sandwich" glazing. In the known process of forming such glazing material, the glass sheets are assembled on opposite sides of the thermoplastic sheet. The glass sheets are pressed against the plastic sheet in preliminary and final bonding stages while the assembly is at a temperature above the softening temperature of the plastic sheet. In the preliminary bonding stage or stages the main central portions of the sheet are pressed against the plastic sheet under atmospheric pressure and in a final or second stage the whole assembly is subjected to increased heating in an autoclave at a pressure of several kg/cm$^2$.

SUMMARY OF THE INVENTION

One object of the present invention is to improve the bonding of glass or vitrocrystalline sheets by means of interlayers of thermoplastic material. It has been found that such an improvement can be effected by performing a special preliminary treatment which forms the subject of the present invention.

This and other objects according to the present invention are accomplished by a process of forming a laminate by heating an assembly comprising at least two sheets of glass or vitrocrystalline material and an intervening thermoplastic layer. In a preliminary treatment stage the assembly is exposed to sub-atmospheric environmental pressure while the assembly is in heated condition and the inter-sheet spaces are subjected to suction at the peripheral margins of the assembly.

The performance of the preliminary treatment according to the invention ensures that when the assembly is subsequently exposed to firm bonding conditions in a final stage, an improved bonding of the glass or vitrocrystalline sheets, and therefore a superior product, is obtained. This appears to be due, at least in part, to removal of some air and moisture and, in some cases, solvent which is present in the plastic, from between the plies before they become firmly bonded together.

In some cases, depending on the temperature in the preliminary treatment zone and the elevation of such treatment, quantities of gas, occluded in the plastic, are removed, and this further contributes to the good results. The sucking off of vapor and/or gas from between the sheets at the margins of the assembly is facilitated by the fact that the whole assembly is exposed to sub-atmospheric environmental pressure. It was found that, in the absence of sub-atmospheric environmental pressure over the central area of the assembly, the suction at the assembly peripheral margins does not have so advantageous an effect, due presumably to trapping of gas bubbles between the sheets in such central part of the assembly.

Another important advantage of the invention is that by appropriate choice of the temperature conditions in the preliminary and subsequent final bonding stages the process cycle can be performed in a shorter time than the process cycle according to conventional practice.

Advantageously, the sub-atmospheric pressure to which the inter-sheet spaces are exposed at the margins of the assembly is different from the sub-atmospheric environmental pressure to which the main part of the assembly is exposed.

Preferably the sub-atmospheric pressure to which the margins of the assembly are exposed is lower than the sub-atmospheric environmental pressure to which the main central area of the assembly is exposed. This feature helps to avoid premature bonding of the sheets or at least to avoid bonding to such extent as substantially to hinder extraction of air and moisture from between the sheets.

In order to promote rapid degasification, the pressure to which the inter-sheet spaces are exposed at the margins of the assembly is preferably not more that 10 mm of mercury.

The environmental pressure to which the main part of the assembly, within its marginal portion, is exposed during the preliminary treatment is preferably not more than 400 mm of mercury. Such pressures are sufficiently below atmospheric to permit substantial extraction of water vapor from between the sheets in a short period of time in the case of assemblies incorporating sheets of a size and weight within the ranges ordinarily encountered in the manufacture of glazing panels. Moreover, if the environmental pressure does not rise above 400 mm of mercury, the effect of exposing the assembly to atmospheric or higher pressure at the end of the preliminary treatment, in forcing the sheets together, can be appreciable.

The environmental temperature during the preliminary treatment according to the invention is preferably at least 60°C. At that temperature the extraction of air and water vapor from between the sheets can proceed reasonably quickly without having to use very low environmental pressures. Generally, useful degasification of the thermoplastic will occur if the preliminary treatment environmental temperature is at least 100°C. It is preferred for the environmental temperature to be not higher than 120°C. If the temperature is maintained at or below that level there is little risk of air and moisture extraction from between the sheets being hindered by premature bonding of the sheets. In one embodiment of the invention, the temperature of the enclosure is chosen so that the temperature of the plastic layer is maintained under the level at which the plastic will begin to stick on glass, i.e., 70° to 80°C in the case of polyvinyl butyral.

During the preliminary treatment the temperature of the assembly may be maintained constant. Preferably the temperature of the assembly is progressively increased in the preliminary treatment stage. Such increase in temperature, moreover, promotes uniform degasification of the intermediary faces of the assembly over the whole area of the assembly without interruption of such degasification as a result of premature effective bonding of the sheets.

The preliminary treatment may, for example, take place in a zone into which the assembly is introduced without being preheated so that the assembly heats up in said enclosure as the preliminary treatment proceeds. The temperature in the preliminary treatment zone may, e.g., be at least 60°C, that being a suitable minimum temperature for the preliminary treatment of assemblies incorporating an interlayer of polyvinyl butyral.

In one preferred embodiment of the invention the assembly is heated so as to maintain a temperature gradient between the central zone and the marginal zone of the assembly, during at least the beginning of the preliminary treatment stage which takes place before the final bonding stage of the assembly.

It has actually been found that while carrying out the process that it is sufficient to heat up certain zones more intensively than others for attaining, while carrying out the final bonding stage, very satisfactory results as far as the final product is concerned. This permits a better utilization of heat during the preliminary prebonding stage, because the heat exchange that takes place within the treatment enclosure can be reduced and this results in an appreciable increase of the capacity and a better output of the vacuum installation. Moreover, it seems that, by proceeding in this manner, it is possible to reduce the risk of a premature and localized adhesion of the intervening thermoplastics layer to the sheets to be bonded together, which may take place when the whole assembly is subjected to a heating action. Such a premature and localized adhesion hinders, to some extent, the degasification of the interspaces of the assembly. Uniform heating of the assembly at sub-atmospheric environmental pressures according to the basic procedure described initially herein brings about a quite good degasification which is achieved by the extraction of a substantial quantity of gas. However, part of such a quantity of gas can not be completely expelled when premature and localized adhesion is taking place. In certain cases, the gases which have not been extracted could be removed during the final bonding stage just by applying elevated pressures, but it is preferable to avoid this procedure. This shortcoming is thus eliminated by the establishment of the above-described temperature gradient.

The pre-heating of the zone of the assembly which is at the highest temperature may be carried on up to the initiation of the pre-bonding step and during or after such a heating, is carried out at the preliminary bonding temperature. The heating may be progressively extended to the neighboring zones, at lower temperatures, until the whole area of the assembly is covered.

By way of example, the central zone may be heated at first in order to carry out the preliminary bonding while the edges are subjected to the suction stage.

While maintaining the marginal zones at a lower temperature, it is possible to avoid the risks of localized and premature bondings referred to above.

Preferably, according to an advantageous embodiment of the invention, the central zone of the assembly is maintained at a temperature which is lower than the preliminary bonding temperature while the marginal zone is progressively heated up to a temperature at which the plastic material begins to stick to the glass. This way of proceeding brings about maximum efficiency. This may be explainable by the fact that one creates, in the central zone of the intersheet spaces of the assembly, a closed pocket in which, due to the application of a suction on the edges, there is no excessive quantity of gas which might be detrimental to subsequent bonding stages. Another advantage may also lie in a gain in time, and as a result an output increase, due to the fact that it is not necessary to wait for the end of the preliminary bonding carried out on the whole assembly, for starting the final bonding step.

This way of proceeding also makes it possible to interrupt sooner the suction exerted on the edges and this results in better use of the energy supply.

Preferably the central zone of the assembly is thermally insulated so as to maintain the zone at a temperature which is lower than the temperature at which the intervening thermoplastic layer begins to stick to the glass. Advantageously several assemblies are disposed on their longitudinal edge at a sufficiently short distance one from another to have the heating action at first confined to the marginal zones of the assemblies.

By proceeding in this manner, it is possible to maintain the temperature gradient between the central zone and the marginal zone by avoiding heat transfers, through radiation or convection, between two successive glazings. Furthermore, the considerable increase of the output of the treatment furnace represents an important advantage, since it is, in this way, possible to provide compact chargings of assemblies which are treated simultaneously.

According to another advantageous embodiment of the invention, a refractory screen is inserted between the heat sources and the faces of the central zone of the assembly, or assemblies, so that the action of the heat is confined to the marginal zones of each assembly. It is thus possible to treat series of assemblies having different curvatures, i.e., assemblies for which it is not possible to sufficiently reduce the space separating two successive assemblies for preventing natural convection phenomena. Moreover, it is, in this way, possible to treat assemblies separately.

It is advantageous to maintain the temperature gradient, at least until the sub-atmospheric pressure around the edges of the assembly is interrupted, in order to facilitate the complete degasification of the intersheet spaces while avoiding simultantaneously the risks of local and premature adhesion.

Preferably, after the bonding stage of the nonmarginal zones of the assembly, the temperature of the central zone and of the marginal zone is progressively equalized while extending the action of heat to the central zone, in order to achieve a bonding as uniformly as possible on the whole area of the glazing.

Advantageously, the action of the heat is extended to the central zone in the form of a forced circulation of the quantity of gas which is enclosing the assembly. According to this embodiment, it is possible to carry out the heating of the central zone only by convection, i.e., without having to make use of intricate heating devices the action of which is limited at time. In other words, just one enclosure heated to a suitable temperature is used to carry out the two temperature rises simply, for example, by operation of fans.

According to another embodiment, the application of heat is extended to the central zone of the assembly by removing the refractory screens positioned in the vicinity of each of the faces of the assembly.

Preferably, the application of heat is carried out by radiation in order to better distribute the heat within the internal layers of the glass sheets and the intervening thermoplastic layer.

An important advantage of the use of the above described apparatus for manufacturing laminated glazings is that it permits a continuous treatment cycle. In other words, for different applications of heat, it is not necessary to plan manipulations or shifting of the assemblies. This would, in fact, necessitate an opening of the enclosure and, as a result, a treatment in series could not be carried out.

According to a very advantageous embodiment of the invention, following the preliminary treatment stage the environmental pressure on the main central part of the assembly is increased while the suction on the margins of the assembly is maintained. This procedure is advantageous because the effective bonding of the sheet can thus be initiated while the suction at the margins is maintained to discourage or prevent formation of bubbles between the sheets.

Preferably, the suction on the margins of the assembly is maintained after the environmental pressure on the main part of the assembly has been increased to atmospheric pressure or higher. This treatment program can be achieved by performing the suction operation on the assembly margins within an enclosure in which the pressure is sub-atmospheric and then, after a suitable interval of time, connecting the interior of the enclosure to atmosphere while keeping the margins of the assembly subjected to suction.

In certain particularly advantageous embodiments of the invention the environmental pressure on the main part of the assembly is increased preferably to atmospheric pressure, after a certain preliminary treatment period and the assembly is subjected in a following final bonding stage to further heating to increase this temperature of the thermoplastic sheet sufficiently for effective bonding to occur with the assembly at atmospheric pressure. In such bonding stage the assembly can, if desired, remain in the enclosure used for the preliminary treatment at sub-atmospheric pressure, or the assembly can be removed from that enclosure to provide space for a following assembly to be treated.

It has been found that when preforming a preliminary treatment according to the invention it becomes possible to dispense with treatment of the assembly at elevated pressure. In such cases the process lends itself to performance in a substantially continuous-flow production line. This is not possible with the conventional process in which the laminates have to be passed singly or in batches into an autoclave for heating under elevated pressure for an appreciable time.

However, it should be understood that neither the use of an autoclave nor the treatment of the assembly at elevated pressure is excluded form the scope of the invention. By way of example, the assembly may be heated in an autoclave in a final stage to remove any possible residual bubbles from the edges of the assembly.

The suction on the margins of the assembly is preferably maintained for only a first part of the bonding stage. The vacuum lines and lip members required for the marginal suction can then be released from the assembly as soon as degasification is complete. In this way they are available for use in degasifying a following assembly while the previously degasified assembly is undergoing completion of bonding in a final stage.

During the bonding stage following the preliminary treatment, the temperature of the assembly is preferably progressively increased. By way of example, after the preliminary treatment at sub-atmospheric pressure the assembly can be introduced into a zone where the temperature is above 100°C. The thermal action thus achieved has multiple beneficial effects on the capillarity, the degasification, and the speed of the operations, and promotes the effective bonding of the sheets by softening or melting of the thermoplastic layer which may, e.g., be composed of a synthetic resin, such as polyvinyl butyral, polyvinyl chloride, a polyolefine, an acrylic resin or a silane.

An increase in temperature during the bonding stage can take place before and/or after suction on the margins of the assembly has been terminated, assuming that that termination takes place in the course of the bonding stage.

The invention includes apparatus for use in forming a laminate and which includes at least two enclosures into which an assembly of sheets for forming a laminate can be introduced in succession. At least one of the enclosures is associated with means for producing sub-atmospheric pressure therein, as well as means for connecting margins of an assembly to a zone of low pressure for maintaining a suction on the margins while the assembly is in the enclosure at sub-atmospheric pressure. The assembly is moved from one enclosure to another by means of a conveyor and means are provided for heating the assembly according to a predetermined schedule. Such an apparatus permits very effective lamination to be performed as hereinbefore described. The performance of lamination in the apparatus can be automated according to a predetermined processing cycle.

According to preferred embodiments of apparatus used in conjunction with the invention, the apparatus comprises separate vacuum circuits for creating a sub-atmospheric pressure in an enclosure on the one hand, and creating the suction on marginal portions of an assembly on the other hand. The performance and control of the successive processing treatments, i.e., the sub-atmospheric preliminary treatment and the bonding treatment at atmospheric or super-atmospheric pressure, is then greatly facilitated.

DESCRIPTION OF THE PREFERRED EMBODIMENTS

Figure 1:
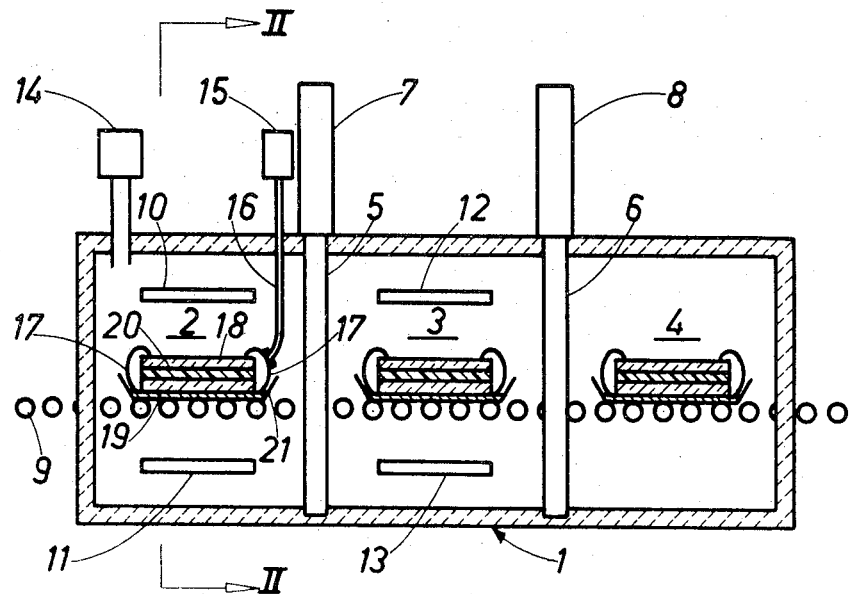
FIG. 1 is an elevational, cross-sectional view taken along the line 1—1 of FIG. 2 of an assembly chamber according to the invention.
Figure 2:
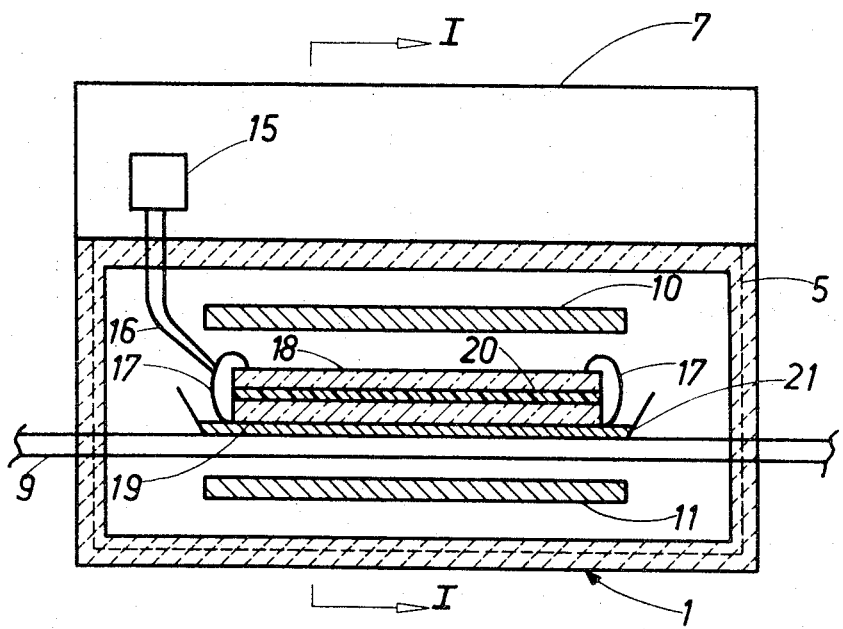
FIG. 2 is an end cross-sectional view taken along the line 2—2 of FIG. 1.

FIGS. 1 and 2 show an assembly chamber generally indicated at 1 which is composed of three chambers or enclosures 2, 3 and 4 that are separated by partitions 5 and 6 controlled by automatic valves 7 and 8, respectively. A roller conveyor 9 passes through the three enclosures 2, 3 and 4 to the unloading station and transports the treated units in translation (without changing their orientation) underneath the assembly chamber to the loading station (not shown).

The enclosures 2 and 3 include heating elements 10, 11, 12 and 13. Enclosure 2 is associated with two vacuum pumps 14 and 15, which are connected respectively to the atmosphere of the chamber 2 and to the peripheral margins of the assembly in the enclosure, according to one embodiment of the invention, by means of a conduit 16 and a sealing joint 17, made of flexible material and enclosing the margins of the assembly.

The apparatus operates in the following described manner. The assembly composed, for example, of two glass sheets 18 and 19 with an intersheet thermoplastic layer 20 is carried on a carriage 21 and is moved into the enclosure 2 by means of the conveyor 9. The sealing joint 17 around the peripheral edges of the assembly is attached to conduit 16 and the assembly is subjected to heat from the heating elements 10 and 11. At the same time, the vacuum pump 14 creates in chamber 2 a pressure below atmospheric, and having a maximum value of 400 millimeters of mercury. Also at the same time the vacuum pump 15 creates suction at the peripheral edges of the assembly and establishes at the edge of the assembly a residual pressure which preferably remains below 10 millimeters of mercury. As a specific example of an operation, the pressure in the enclosure was 200 millimeters of mercury while the pressure maintained at the peripheral edges of the assembly was 3 millimeters of mercury.

During the treatment, the temperature can be progressively increased from the level existing when the assembly is introduced into the enclosure. For example, in one operation the increase was set at a rate of 6°C per minute.

When the assembly attains a temperature of 80°C, atmospheric pressure is re-established in the chamber 2 and the operation passes to a pre-cementing step. The thermal action of the heating elements 10 and 11 is continued until the assembly reaches 100°C. At this temperature, the conduit 16 is disconnected from the joint 17 to re-establish atmospheric pressure on the entirety of the assembly.

The automatic valve 7 then controls the opening of (sliding) partition 5 and the carriage 21 passes into chamber 3, which is maintained by heating elements 12 and 13 at a temperature of 120°C. This temperature can be raised to 150°C. In chamber 3, the assembly continues to be subjected to the action of the heat until it reaches 140°C, a temperature at which the intervening layer attains its maximum adherence qualities.

At this temperature, when the bonding or cementing conditions are achieved, the automatic valve 8 opens the partition 6 in a manner to permit the displacement of carriage 21 toward the chamber 4, where the assembly can be progressively cooled before being conveyed toward the unloading station.

Figure 3:
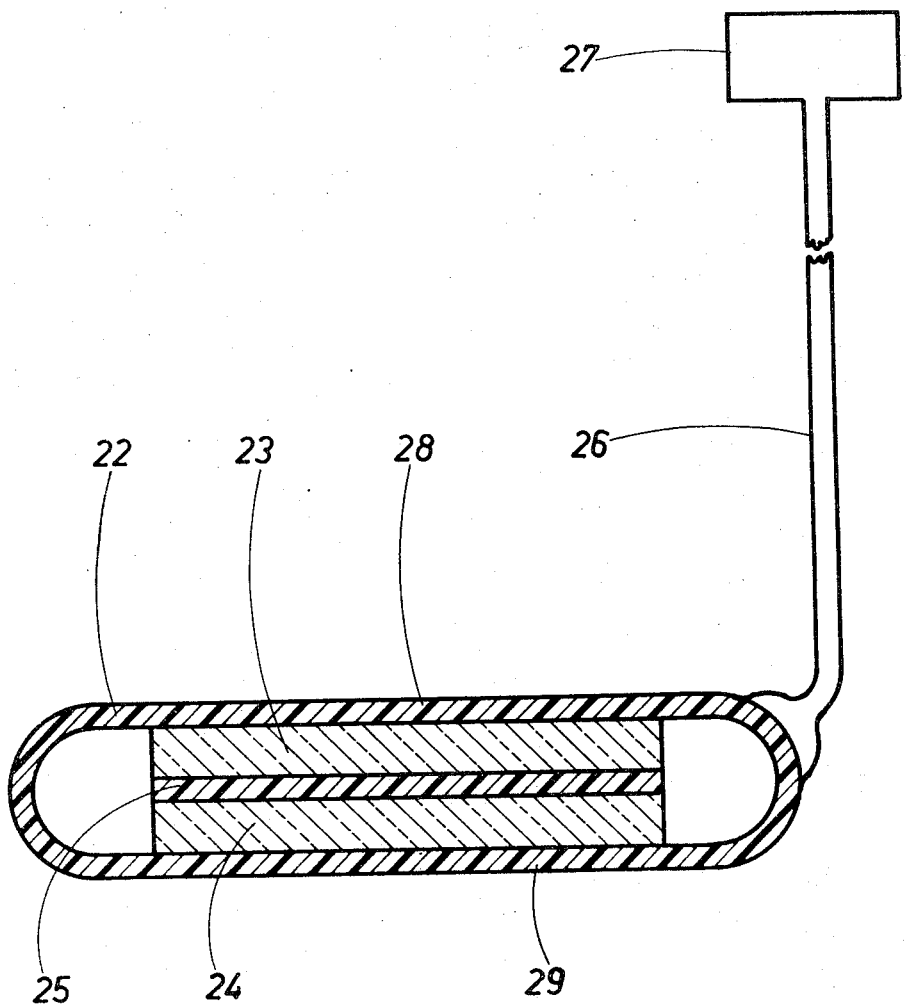
FIG. 3 is a sectional view of another embodiment of a sealing arrangement according to the invention.

FIG. 3 shows another arrangement for aspirating fluid substances from the intersheet spaces of the assembly at its edges. In this arrangement an envelope, generally indicated at 22, encloses the entire assembly of the glass sheets 23 and 24 and the intervening thermoplastic layer 25. The envelope is connected by a vacuum line 26 to a pump 27 by which sub-atmospheric pressure can be maintained within the envelope to keep the intersheet spaces subjected to suction. When the pump is operated, the top wall 28 and the bottom wall 29 of the envelope are drawn against the main external faces of the enclosed assembly. However, the envelope 22, at least at its peripheral zone, is sufficiently rigid to resist collapse against the edges of the assembly so that a space at a sub-atmospheric pressure, maintained by the pump 27, is preserved within the envelope, around the edges of the assembly. The use of an envelope to enclose the assembly is advantageous in that the size of the envelope, in relation to the dimensions of the assembly, is not critical. The envelope can be easily applied to assemblies of a range of different sizes. Moreover, if the assembly should be curved, as for example may be in the case when laminating sheets to form a vehicle windshield, the curvature does not cause an difficulties in sealing the edges to a vacuum line, such as may be experienced when using an endless tube sealing device. In addition, the envelope does not hinder uniform heating of the whole assembly.

Figure 4:
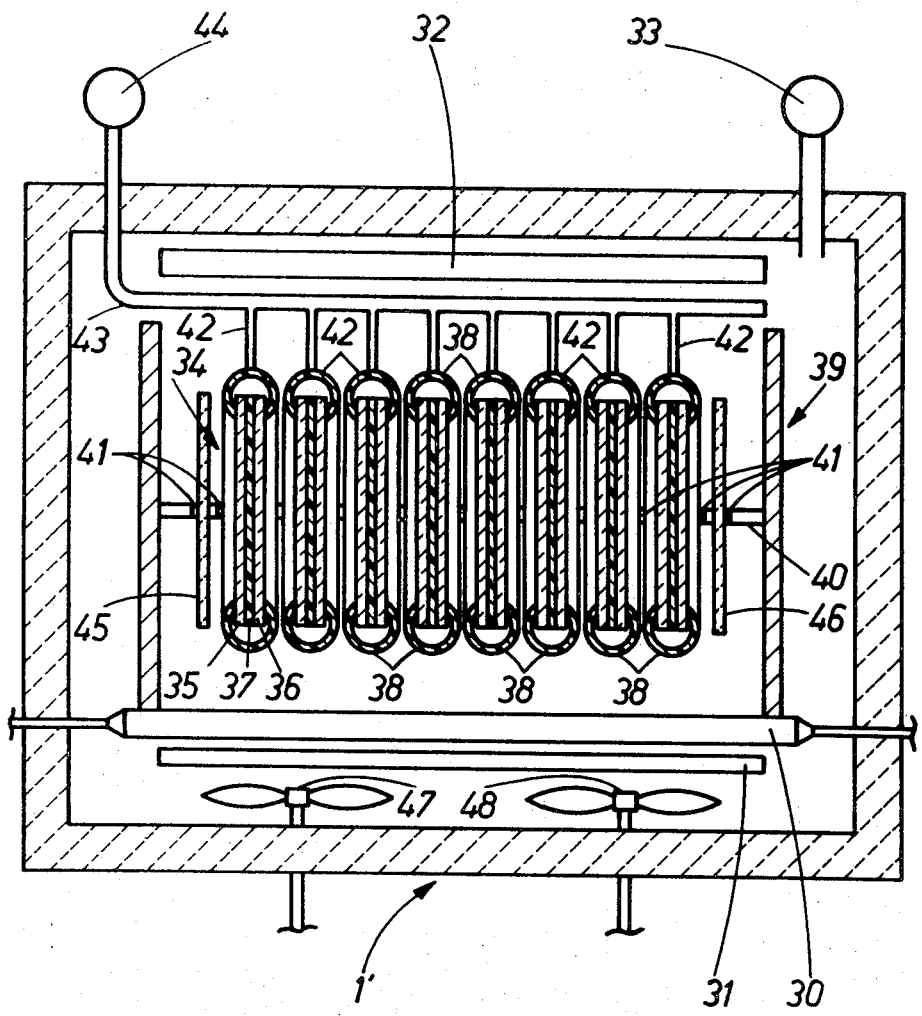
FIG. 4 is a sectional view of another embodiment of an assembly chamber according to the invention.

Attention is now directed to FIG. 4 which shows another embodiment of a chamber, indicated generally at 1'. In this treatment enclosure there is a roller conveyor 30 and radiant heating elements 31 and 32 which have been disgrammatically represented. The enclosure 1' may be connected through a vacuum line to a vacuum pump 33.

The assemblies, generally indicated at 34, are, as described in conjunction with the embodiment disclosed in FIG. 1, composed of two glass sheets 35 and 36 with an intervening plastic layer 37, for example, polyvinyl butyral. Around the periphery of each assembly an endless tube 38 is installed for each assembly. The assemblies 34 are placed side by side, in a substantially standing or upright position, in a frame, generally indicated at 39, having metal profiles which are suitably connected so that opposed members, one of which is shown at 40, will have notches 41 in which the assemblies 34 are inserted and maintained. The frame 39 lies on the roller conveyor which moves the frame within the enclosure 1'.

The endless tubes 38 are connected, via soft conduits 42 and a tube 43 to a vacuum pump 44 which is capable of applying a sub-atmospheric pressure in the endless tubes 38 and therefore in the intersheet spaces of each assembly.

On the frame 39, the assemblies are disposed standing on their longitudinal edge and, as above mentioned, are maintained in such a position by the notches 41. The assemblies are located at a certain distance one from another, in such a way that the natural convection phenomenon between the external faces of each assembly is considerably reduced. As an example, in one arrangement the distance separating two successive tubes 38 was 11 mm, the assemblies being located at a 28 mm distance one from another. Due to such a disposition, the radiant heating elements 31 and 32 act directly on the marginal zones of the assemblies, without acting however on the central zones of these assemblies, either directly by radiation, or indirectly by convection. On each side of the set of assemblies, screens 45 and 46 are positioned so as to protect the central zone of the external faces of the set of assemblies against the action exerted by the heat.

The apparatus also has two fan blades 47 and 48 located on a wall of the enclosure 1' so that when these fan blades are rotated their action can be exercised parallel to the faces of the assemblies. The fan blades are driven by electric motors not shown in the figure. According to an advantageous way of modification suitable screens, not shown, are positioned for directing the air flow from the fan blades between the assemblies. A quick heat transfer and, as a result, a shorter heating time can thus be obtained.

The apparatus functions in the following described manner: A charge of assemblies 34 resting on the frame 39 is introduced into the enclosure 1'. After the enclosure 1' has been shut, each assembly is subjected, on one hand, to the thermal action exercised by the radiant heating elements 31 and 32 and, on the other hand, to a suction applied to the intersheet spaces of each assembly by means of a sub-atmospheric pressure of 10 mm of mercury created by the vacuum pump 44. At the same time, the vacuum pump 33 progressively creates and maintains, within the enclosure 1', a sub-atmospheric pressure of 400 mm of mercury or more. As an example, in one operation the pressure was 150 mm of mercury. However, according to that process, it was found that it was possible to attain good bonding conditions with higher sub-atmospheric pressures applied on the edges, for example with pressures lying between 150 and 200 mm of mercury.

At such sub-atmospheric pressures, the marginal zones of the assemblies are subjected to a progressive rise of temperature. When the marginal zone of each intervening plastic layer reaches the softening point of the plastic material of which it is made, the preliminary bonding of the edges of the assemblies 34 begins. As an example, when the intervening plastics layer is polyvinyl butyral, the softening temperature of which lies around 60°C, the preliminary bonding of the edges is considerably promoted by a progressive rise of the sub-atmospheric pressure which is prevailing within the enclosure 1. So, as soon as the polyvinyl butyral reaches a temperature of 60°C in the marginal zone of each assembly, it has been found that a sub-atmospheric pressure of 300 mm of mercury within the enclosure was sufficient to put an end to the preliminary bonding stage of the edges. As soon as the preliminary bonding is terminated ans while continuing, on one hand, to maintain suction on the edges and, on the other hand, to raise the sub-atmospheric pressure prevailing within the enclosure, while the temperature of the marginal zones is still rising, the fan blades 47 and 48 are put into operation. This is done in order to bring about a forced circulation of the hot gases of the enclosure within the spaces separating two successive asemblies 34. In this way, it is possible to achieve a rise in temperature of the central zones of the assemblies.

The rise of the sub-atmospheric pressure prevailing within the enclosure up to the value of the atmospheric pressure takes place progressively. As an example, in one operation, the rise took 45 seconds. During other tests performed, the time was in the order of between 30 seconds and several minutes. According to the particular time involved, the fan blades are put into operation before, or immediately after, atmospheric pressure again prevails within the enclosure 1.

When the periphery of each assembly 34 reaches a temperature of 100°C, the suction exercised on the edges is interrupted and the sub-atmospheric pressure prevailing in the intersheet spaces of each assembly is progressively brought back to atmospheric pressure. The rise in temperature is then carried on until each assembly 34 reaches 140°C, the temperature at which the intervening thermoplastic layer reaches its maximum adhesiveness.

By the way of modification, it is possible to insert refractory screens between two successive assemblies of the charge and these protect the central zones of the assemblies against the action of the heat. This arrangement is utilized when windshields having different radius of curvature are charged on frame 39. In this case, the juxtaposition of these assemblies is such that it is not possible to provide sufficiently narrow spaces between the assemblies so as to prevent the central zones of these assemblies from being subjected to the heating action by convection.

Figure 5:
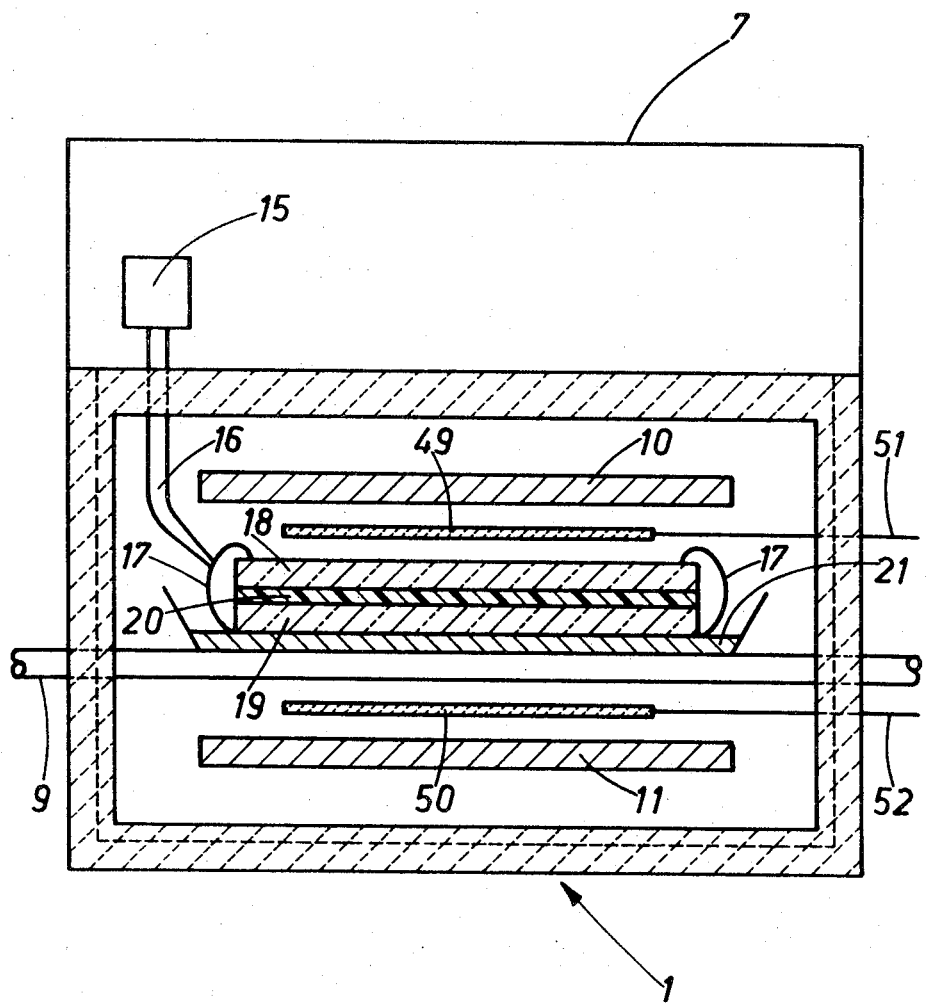
FIG. 5 is a view similar to FIG. 2 but showing refractory screens in the assembly chamber.

By using refractory screens, it is also possible to treat assemblies separately, such as described in conjunction with FIGS. 1 to 3. Such screens may be made, for example, of asbestos sheets or of sheets of glass which prevent the central zone of the assembly from being subjected to radiation and convection. The sheets are not shown in FIG. 4 because of the close relationship between the assemblies but such can be suitably supported adjacent these assemblies by mounting in frame 39 or by other appropriate mounting frames. Refractory screens are shown in FIG. 5 as disposed in an assembly chamber. These screens are designated by reference numerals 49 and 50.

It will be understood that the above description of the present invention is susceptible to various modifications, changes and adaptations, and the same are intended to be comprehended within the meaning and range of equivalents of the appended claims.

We claim:

1. In a process of forming a laminate by heating an assembly including at least two sheets of glass or vitrocrystalline material and an intervening thermoplastic layer, to at least soften the thermoplastic layer, and applying pressure to and heating the assembly sufficiently to firmly bond the sheets by means of such thermoplastic layer, the improvement prior to the step of applying pressure to and heating the assembly, comprising the steps of: simultaneously applying a sub-atmospheric environmental pressure to the assembly and heating the assembly to soften the thermoplastic layer and applying along the margins of the assembly a sub-atmospheric pressure which is lower than the sub-atmospheric environmental pressure applied to the assembly, whereby the intersheet spaces are subjected to suction.

2. A process as defined in claim 1 wherein the steps carried out prior to the step of applying pressure to and heating the assembly are all initiated at the same time.

3. A process as defined in claim 2 wherein the sub-atmospheric environmental pressure which is applied to the assembly is maintained at that pressure level for a period of time and is then increased while the sub-atmospheric pressure on the margins of the assembly is maintained.

4. A process as defined in claim 3 wherein the heating of the assembly is continued following the increase of environmental pressure.

5. A process as defined in claim 3 wherein the sub-atmospheric environmental pressure is increased to atmospheric environmental pressure.

6. A process as defined in claim 5 wherein the sub-atmospheric pressure along the margins of the assembly is terminated after a period of time following the increase in the environmental pressure to atmospheric pressure.

7. A process as defined in claim 6 wherein following the termination of the sub-atmospheric pressure along the margins of the assembly the temperature of the assembly is progressively increased.

8. A process as defined in claim 7 wherein the temperature of the assembly is progressively increased from a starting temperature which is above 100°C.

9. A process as defined in claim 1 wherein the sub-atmospheric pressure to which the intersheet spaces are exposed at the margins of the assembly is not more than 10 mm of mercury.

10. A process as defined in claim 1 wherein the sub-atmospheric environmental pressure to which the assembly is exposed is not more than 400 mm of mercury.

11. A process as defined in claim 1 wherein the temperature of the assembly is progressively increased prior to the step of applying pressure to and heating the assembly.

12. A process as defined in claim 11 wherein the step of heating the assembly to soften the thermoplastic layer is initiated at an elevated temperature.

13. A process as defined in claim 12 wherein the assembly is not preheated prior to heating at an elevated temperature.

14. A process as defined in claim 12 wherein the elevated temperature is at least 60°C.

15. A process as defined in claim 1 wherein, during at least the initiation of the step of heating the assembly to soften the thermoplastic layer, a temperature gradient is maintained between a central zone of the assembly and a zone at the margins of the assembly.

16. A process as defined in claim 15 wherein the central zone of the assembly is maintained at a temperature which is below a preliminary bonding temperature of the thermoplastic layer and the marginal zone is progressively heated up to a temperature at which the plastic material begins to stick to the glass.

17. A process as defined in claim 16 wherein the central zone is insulated from the source of heat in order to maintain that zone at a temperature lower than the temperature at which the plastic material begins to stick to the glass.

18. A process as defined in claim 17 wherein a plurality of assemblies are disposed along their respectively longitudinal edges to be in spaced relationship but in relatively close proximity to each other to insulate the central zones of the assemblies from the source of heat and confine the heating of the assemblies to the marginal zones of these assemblies.

19. A process as defined in claim 17 wherein the central zone of an assembly is insulated from the source of heat by a refractory screen which is inserted between the heat source and the faces of the assembly at the central zone thereof.

20. A process as defined in claim 16 wherein, after the bonding of the marginal zone of the assembly has been carried out, the temperature of the central zone and that of the marginal zone are progressively equalized by extending the action of the heat to the central zone.

21. A process as defined in claim 20 wherein the action of the heat is extended to the central zone by a forced circulation of the quantities of gas which enclose an assembly.

22. A process as defined in claim 21 wherein the action of the heat is extended to the central zone by removing refractory screens positioned between the source of heat and the central zone.

23. A process as defined in claim 15 wherein the heating of the assembly is achieved by heat radiation.

24. A process as defined in claim 15 wherein the tmeperature gradient is maintained at least until the sub-atmospheric pressure along the margins of the assembly is interrupted.

* * * * *

UNITED STATES PATENT OFFICE
CERTIFICATE OF CORRECTION

Patent No. 3,852,136      Dated December 3rd, 1974

Inventor(s) Emile Plumat et al

It is certified that error appears in the above-identified patent and that said Letters Patent are hereby corrected as shown below:

In the heading of the patent under [75] Inventors, line 2, change "Colignon" to --Collignon--; under [30] Foreign Application Priority Data, insert --March 3, 1971 Luxembourg 62,707--.

Column 5, line 44, change "preforming" to --performing--.

Column 8, line 15, change "an" to --any--; line 24, change "disgrammatically" to --diagrammatically--.

Column 9, line 42, change "ans" to --and--; line 49, change "asemblies" to --assemblies--.

Column 12, line 36, change "tmeperature" to --temperature--.

Signed and sealed this 15th day of April 1975.

(SEAL)
Attest:

RUTH C. MASON
Attesting Officer

C. MARSHALL DANN
Commissioner of Patents
and Trademarks